United States Patent
Svartstrom

(10) Patent No.: US 9,567,114 B2
(45) Date of Patent: Feb. 14, 2017

(54) COMBINED PRESSURE AND THERMAL WINDOW SYSTEM FOR SPACE VEHICLES

(71) Applicant: The Boeing Company, Chicago, IL (US)

(72) Inventor: Kirk Nils Svartstrom, Fountain Valley, CA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 14/692,744

(22) Filed: Apr. 22, 2015

(65) Prior Publication Data

US 2015/0225093 A1 Aug. 13, 2015

Related U.S. Application Data

(63) Continuation of application No. 13/305,573, filed on Nov. 28, 2011, now Pat. No. 9,016,629.

(51) Int. Cl.
| | | |
|---|---|---|
| *B64C 1/14* | (2006.01) | |
| *B64G 1/58* | (2006.01) | |
| *B64G 1/52* | (2006.01) | |
| *B64G 1/66* | (2006.01) | |
| *B64G 1/12* | (2006.01) | |
| *B64G 1/62* | (2006.01) | |

(52) U.S. Cl.
CPC ............ *B64G 1/58* (2013.01); *B64C 1/1492* (2013.01); *B64G 1/52* (2013.01); *B64G 1/66* (2013.01); *B64G 1/12* (2013.01); *B64G 1/62* (2013.01)

(58) Field of Classification Search
CPC ............ B64G 1/58; B64G 1/166; B64G 1/52; B64G 1/62; B64G 1/12; B64C 1/1492
See application file for complete search history.

(56) References Cited

U.S. PATENT DOCUMENTS

| 1,029,381 | A | * | 6/1912 | Lunken | ............ E06B 3/44 |
| | | | | | 292/DIG. 70 |
| 2,106,900 | A | * | 2/1938 | Owen | .......... E06B 3/2605 |
| | | | | | 52/204.595 |
| 2,278,694 | A | * | 4/1942 | Firner | ............ E06B 3/66347 |
| | | | | | 52/172 |
| 2,409,808 | A | * | 10/1946 | Sowle | ............ B64C 1/1492 |
| | | | | | 52/204.595 |

(Continued)

OTHER PUBLICATIONS

Leger et al., "Apollo Experience Report—Window Contamination," NASA Technical Note, Manned Spacecraft Center, Houston, TX, Mar. 1972, 17 pp.

(Continued)

*Primary Examiner* — Jeanette E Chapman
(74) *Attorney, Agent, or Firm* — Yee & Associates, P.C.

(57) ABSTRACT

A window system for a vehicle comprising a pressure and thermal window pane, a seal system, and a retainer system. The pressure and thermal window pane may be configured to provide desired pressure protection and desired thermal protection when exposed to an environment around the vehicle during operation of the vehicle. The pressure and thermal window pane may have a desired ductility. The seal system may be configured to contact the pressure and thermal window pane to seal the pressure and thermal window pane. The retainer system may be configured to hold the seal system and the pressure and thermal window pane.

22 Claims, 9 Drawing Sheets

(56) References Cited

U.S. PATENT DOCUMENTS

| | | | | |
|---|---|---|---|---|
| 2,536,351 | A * | 1/1951 | Bureau | E06B 3/26347 49/473 |
| 2,989,787 | A * | 6/1961 | Smith | B64C 1/1492 359/490.02 |
| 3,468,064 | A * | 9/1969 | Melanson | E06B 3/4681 49/413 |
| 3,885,072 | A * | 5/1975 | Zibritosky | B64C 1/1492 156/109 |
| 5,271,581 | A | 12/1993 | Irish | |
| 5,467,943 | A | 11/1995 | Umeda | |
| 5,507,181 | A * | 4/1996 | Fox | G01F 23/284 342/124 |
| 6,938,858 | B1 | 9/2005 | Schneider et al. | |
| 7,823,833 | B2 | 11/2010 | Wood | |
| 8,904,887 | B2 * | 12/2014 | Tockstein | G01N 17/00 73/865.6 |
| 9,016,629 | B1 * | 4/2015 | Svartstrom | B64C 1/1492 244/129.3 |
| 2009/0084900 | A1 | 4/2009 | Krahn | |
| 2009/0230246 | A1 | 9/2009 | Depeige et al. | |
| 2010/0044513 | A1 | 2/2010 | Gallant et al. | |
| 2010/0051747 | A1 | 3/2010 | Mouton | |
| 2010/0127126 | A1 | 5/2010 | Lieven | |
| 2010/0163676 | A1 | 7/2010 | Burgunder et al. | |
| 2015/0138622 | A1 * | 5/2015 | Driscoll | B64C 1/1492 359/275 |

OTHER PUBLICATIONS

Grimm, "Requirements for Optical Properties for Windows Used in Crewed Spacecraft," Engineering Directorate, National Aeronautics and Space Administration, Jun. 2007, pp. 1-A3.

"Strength Design and Verification Criteria for Glass, Ceramics and Windows in Human Space Flight Application," Engineering Di, rectorate, Structural Engineering Division, National Aeronautics and Space Administration, Sep. 2006, pp. 1-27.

"Structural Design Requirements and Factors of Safety for Spaceflight Hardware," for Human Spaceflight, National Aeronautics and Space Administration, Apr. 2010, pp. 1-48.

"Man-Systems Integration Standards," National Aeronautics and Space Administration, NASA-STD-3000, vol. I, Rev. B, Jul. 1995, 789 pp.

"Man-Systems Integration Standards," National Aeronautics and Space Administration, NASA-STD-3000, vol. II, Rev. B, Jul. 1995, 549 pp.

"Man-Systems Integration Standards," National Aeronautics and Space Administration, NASA-STD-3000, vol. II, Rev. A, Aug. 1994, 296 pp.

"Structural Design and Verification Requirements," National Aeronautics and Space Administration, International Space Station, Rev. C, Sep. 2000, 51 pp.

Office Action, dated Apr. 18, 2014, regarding U.S. Appl. No. 13/305,573, 17 pages.

Notice of Allowance, dated Dec. 29, 2014, regarding U.S. Appl. No. 13/305,573, 8 pages.

* cited by examiner

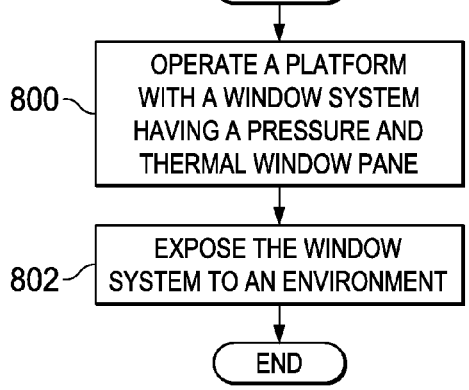
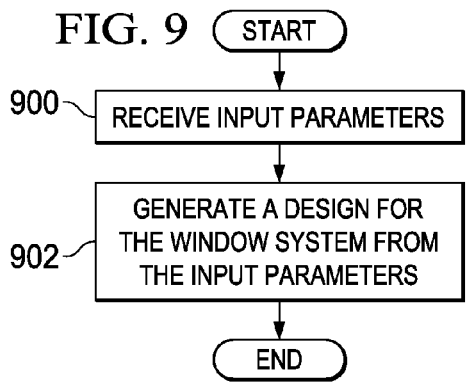
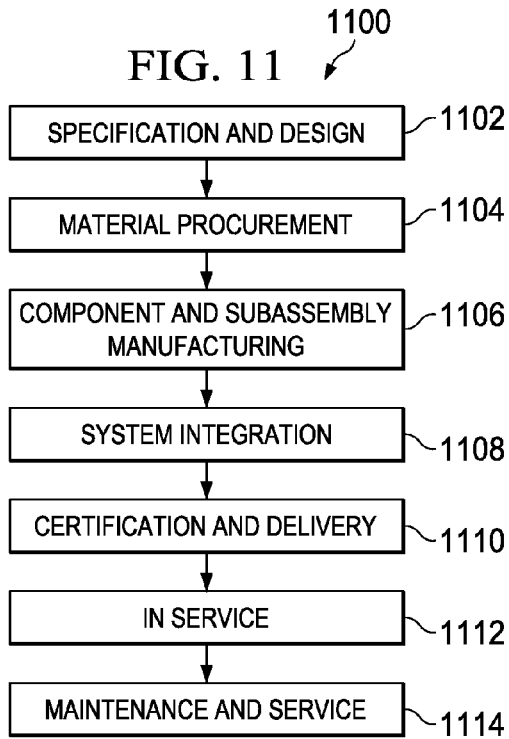
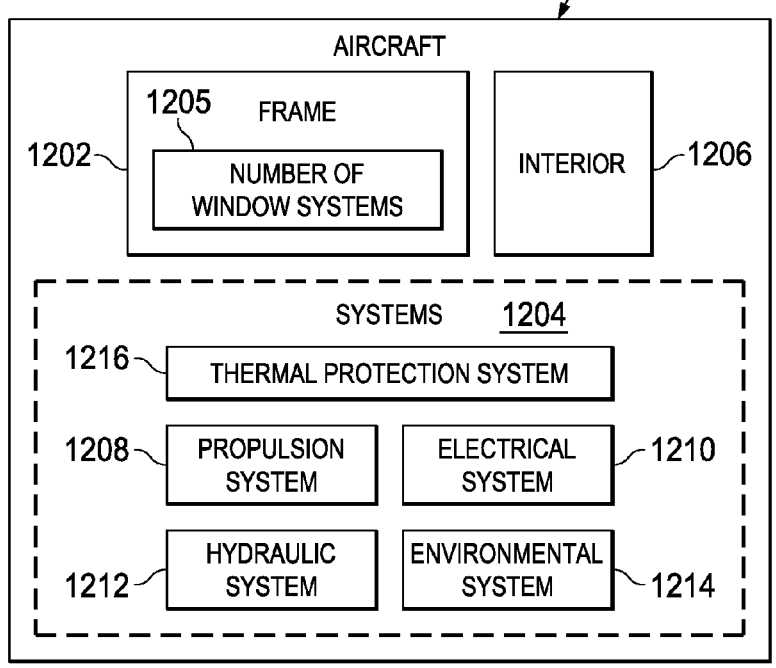

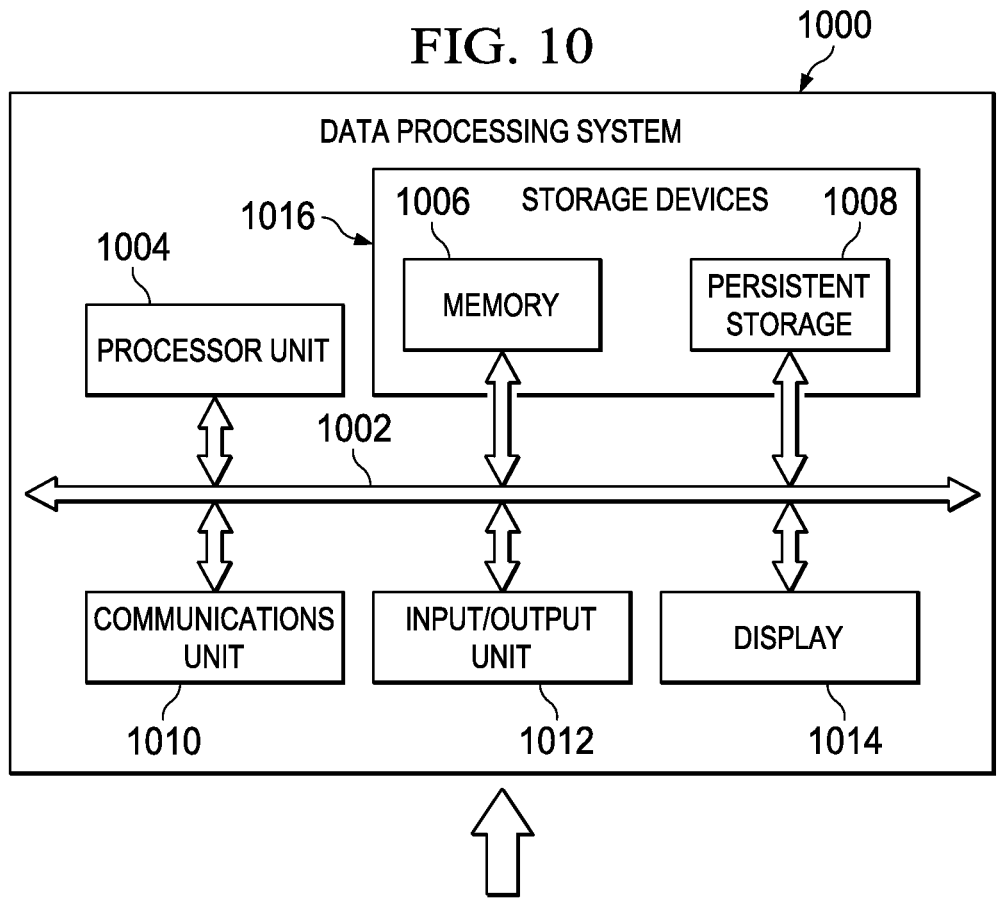
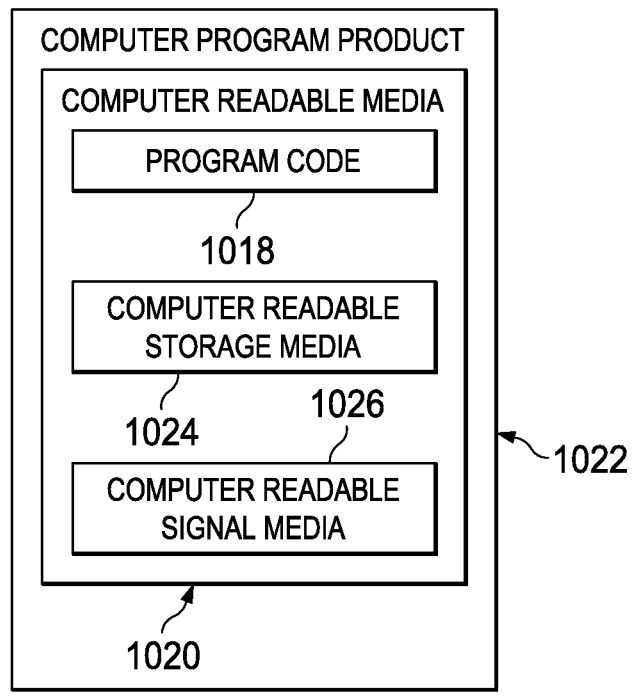
FIG. 10

COMBINED PRESSURE AND THERMAL WINDOW SYSTEM FOR SPACE VEHICLES

The present application is a continuation application of U.S. Pat. No. 9,016,629 filed Mar. 4, 2008, issued Apr. 28, 2015.

GOVERNMENT LICENSE RIGHTS

The application described herein was made in the performance of work under National Aeronautics and Space Administration (NASA) contract number NNK11MS03S and is subject to the provisions of Section 305 of the National Aeronautics and Space Act of 1958 (72 Stat.435: 42U.S.C.2457).

BACKGROUND INFORMATION

1. Field

The present disclosure relates generally to vehicles and, in particular, to space vehicles. Still more particularly, the present disclosure relates to a combined pressure and thermal window pane for space vehicles.

2. Background

Some spacecraft may be designed to repeatedly be launched into space and re-enter the atmosphere. These types of spacecraft may be subjected to temperatures that may reach over about 1,500 degrees Celsius when re-entering the atmosphere. Further, loads also may be placed on different structures of the spacecraft during re-entry as well as during launching of the vehicle into space.

These types of events may result in undesired inconsistencies in window systems in a spacecraft. For example, without limitation, a window may not provide the optical clarity that may be desired for observing objects outside of the spacecraft or the desired strength for a subsequent re-entry.

Window systems for space vehicles that re-enter the atmosphere may have window systems designed to withstand those types of environments. A window system in a space vehicle that re-enters the atmosphere may use multiple panes. Window systems may typically have two types of window panes.

One type of window pane may be used for pressure protection, while another type of window pane may be used for thermal protection. The pressure may be internal pressure inside the spacecraft. The thermal protection may be protection against heat from the exterior of the spacecraft. These designs may be more complex and may weigh more than desired. Further, when two types of window panes are used in a window system, the number of components used in the spacecraft may be increased in a manner that results in more maintenance than desired.

Some currently used window panes may be comprised of fused silica. Fused silica may have optical qualities that make fused silica desirable for use in window panes. However, the brittleness of this type of material may result in more and/or thicker window panes being used in a window system than is desirable.

For example, without limitation, the optical clarity provided by a window pane comprised of fused silica may decrease as the thickness of the window pane increases. Consequently, additional window panes may be used in addition to and/or instead of increasing the thickness of the window pane when the window pane does not perform as desired.

Further, window panes comprised of fused silica may not provide a desired level of thermal protection. For example, without limitation, window panes comprised of fused silica may be unable to provide a desired level of protection from heat encountered during re-entry of a space vehicle from outer space into the atmosphere and/or provide a desired level of protection from the cold environment encountered in outer space.

Therefore, it would be desirable to have a method and apparatus that takes into account at least some of the issues discussed above, as well as possibly other issues.

SUMMARY

In one illustrative embodiment, a window system for a vehicle may comprise a pressure and thermal window pane, a seal system, and a retainer system. The pressure and thermal window pane may be configured to provide desired pressure protection and desired thermal protection when exposed to an environment around the vehicle during operation of the vehicle. The pressure and thermal window pane may have a desired ductility. The seal system may be configured to contact the pressure and thermal window pane to seal the pressure and thermal window pane. The retainer system may be configured to hold the seal system and the pressure and thermal window pane.

In another illustrative embodiment, a method for operating a platform may be provided. The platform may be operated having a window system comprising a pressure and thermal window pane configured to provide desired pressure protection and desired thermal protection when exposed to an environment around the platform during operation of the platform. The pressure and thermal window pane may have a desired ductility. The platform may also have a seal system configured to contact the pressure and thermal window pane to seal the pressure and thermal window pane. The platform may also have a retainer system configured to hold the seal system and the pressure and thermal window pane. The window system may be exposed to the environment while the platform is operating.

In yet another illustrative embodiment, a window system for a spacecraft may comprise a pressure and thermal window pane, a primary thermal window pane, a seal system, and a retainer system. The pressure and thermal window pane may be configured to provide desired pressure protection and desired thermal protection when exposed to an environment around the spacecraft during operation of the spacecraft. The pressure and thermal window pane may be comprised of a number of materials selected such that the pressure and thermal window pane has a desired structural performance and a desired optical performance. The desired structural performance may comprise a desired ductility, a desired strength, and a desired thermal resistance. The number of materials may include at least one of a thermal plastic polymer, a polycarbonate, polymethyl methacrylate, a transparent composite, and acrylic. The primary thermal window pane may be configured to provide additional thermal protection. The seal system may be configured to contact the pressure and thermal window pane to seal the pressure and thermal window pane and contact the primary thermal window pane to seal the primary thermal window pane. The seal system may comprise at least one of a number of pressure seals and a number of thermal seals. The seal system may be configured to reduce leaks when a pressure is present. The retainer system may be configured to hold the seal system, the pressure and thermal window pane, and the primary thermal window pane. The retainer system may comprise a first inner retainer. The first inner retainer may be configured to receive the seal system and the pressure and thermal window pane. The retainer system may further comprise a first outer retainer. The first outer retainer may be configured to be connected to the first inner retainer such that the pressure and thermal window pane and the seal system are held in place by the first outer retainer and the first inner retainer such that the pressure and thermal window pane remains sealed. The retainer system may further comprise a second outer retainer. The second outer retainer may be configured to receive the seal system and the primary thermal window pane. The retainer system may further comprise a second inner retainer. The second inner retainer may be configured to connect with the second outer retainer such that the primary thermal window pane and the seal system are held in place by the second outer retainer and the second inner retainer such that the primary thermal window pane remains sealed. The retainer system may further comprise a thermal protection system.

In yet another illustrative embodiment, a method for operating a spacecraft may be provided. The spacecraft may be operated having a window system. The window system may comprise a pressure and thermal window pane. The pressure and thermal window pane may be configured to provide desired pressure protection and desired thermal protection when exposed to an environment around the spacecraft during operation of the spacecraft. The pressure and thermal window pane may be comprised of a number of materials selected such that the pressure and thermal window pane may have a desired structural performance and a desired optical performance. The desired structural performance may comprise a desired ductility, a desired strength, and a desired thermal resistance. The number of materials may include at least one of a thermal plastic polymer, a polycarbonate, polymethyl methacrylate, a transparent composite, and acrylic. The window system may further comprise a primary thermal window pane. The primary thermal window pane may be configured to provide additional thermal protection. The window system may further comprise the seal system configured to contact the pressure and thermal window pane to seal the pressure and thermal window pane and contact the primary thermal window pane to seal the primary thermal window pane. The seal system may comprise at least one of a number of pressure seals and a number of thermal seals. The seal system may be configured to reduce leaks when a pressure is present. The window system may further comprise a retainer system configured to hold the seal system, the pressure and thermal window pane, and the thermal window pane. The retainer system may comprise a first inner retainer configured to receive the seal system and the pressure and thermal window pane. The retainer system may further comprise a first outer retainer configured to be connected to the first inner retainer such that the pressure and thermal window pane and the seal system are held in place by the first outer retainer and the first inner retainer such that the pressure and thermal window pane remains sealed. The retainer system may further comprise a second outer retainer configured to receive the seal system and the primary thermal window pane and a second inner retainer. The second inner retainer may be configured to connect with the second outer retainer such that the primary thermal window pane and the seal system are held in place by the second outer retainer and the second inner retainer such that the primary thermal window pane remains sealed. The window system may further comprise a thermal protection system. The window system may be exposed to the environment while the spacecraft is operating. The environment may be selected from at least one of outer space, an underwater environment, an atmosphere, a re-entry environment, and a launch environment.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives thereof will best be understood by reference to the following detailed description of an illustrative embodiment of the present disclosure when read in conjunction with the accompanying drawings, wherein:

FIG. 8 is an illustration of a flowchart of a process for operating a vehicle in accordance with an illustrative embodiment;

FIG. 9 is an illustration of a flowchart of a process for designing a window system in accordance with an illustrative embodiment;

FIG. 10 is an illustration of a data processing system in accordance with an illustrative embodiment;

FIG. 11 is an illustration of a platform manufacturing and service method in accordance with an illustrative embodiment; and FIG. 12 is an illustration of a platform in which an illustrative embodiment may be implemented.

DETAILED DESCRIPTION

The different illustrative embodiments recognize and take into account that having a single window pane that provides both pressure protection and thermal protection may be more desirable than having one window pane that provides pressure protection and another window pane that provides thermal protection. Further, the different illustrative embodiments recognize and take into account that using a single window pane that provides both pressure protection and thermal protection for each window system in a spacecraft may reduce the weight of the spacecraft as compared to using multiple window panes for each window system.

Thus, the illustrative embodiments provide a window system having a window pane that may function in both pressure and thermal environments. In one illustrative embodiment, a window system for a vehicle may comprise a pressure and thermal window pane, a seal system, and a retainer system. The pressure and thermal window pane may be configured to provide desired pressure protection and desired thermal protection when exposed to an environment around the vehicle during operation of the vehicle. The pressure and thermal window pane may have a desired ductility. The seal system may be configured to contact the pressure and thermal window pane to seal the pressure and thermal window pane. The retainer system may be configured to hold the seal system and the pressure and thermal window pane.

Figure 1:
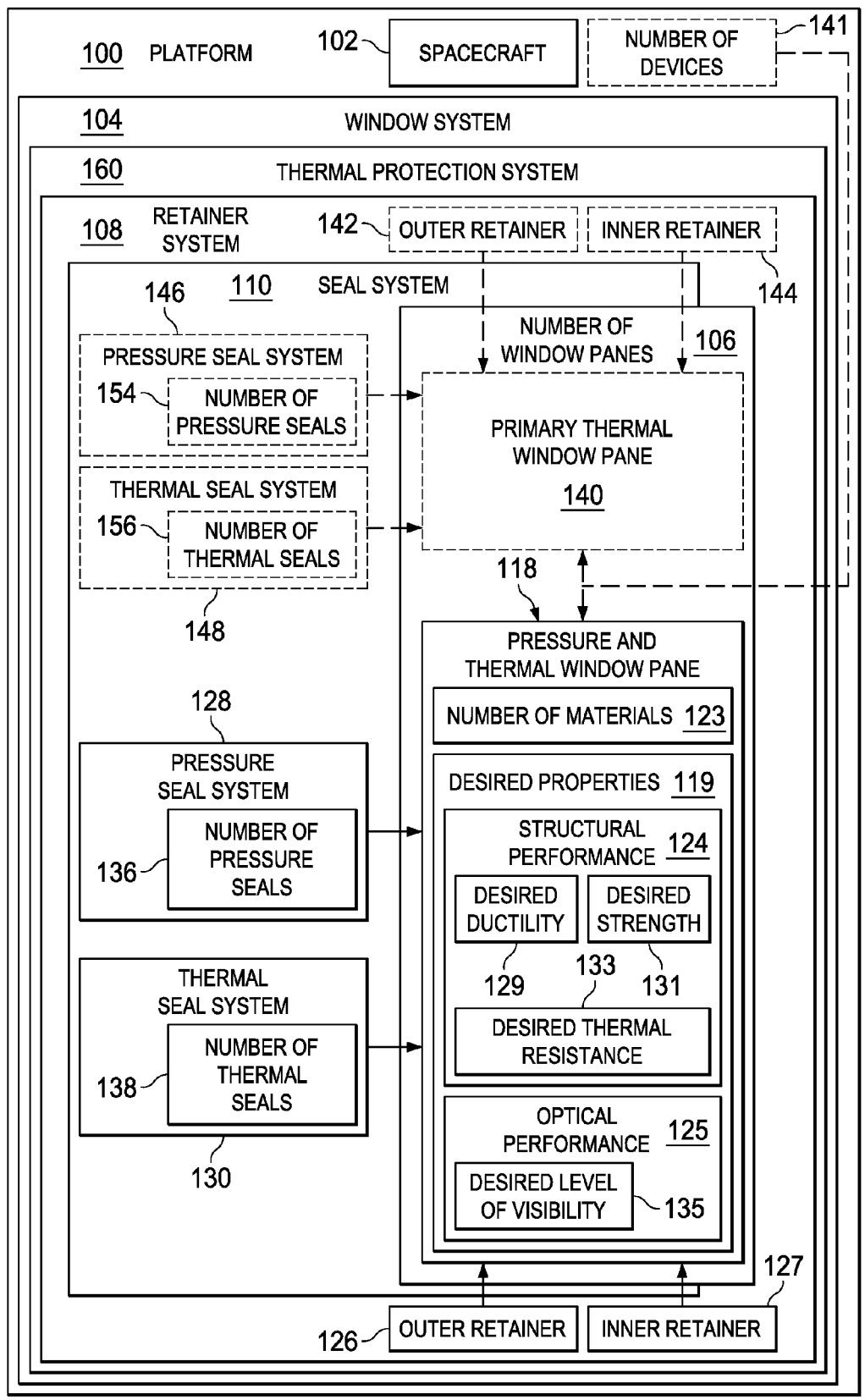
FIG. 1 is an illustration of a platform in which a window system may be implemented in accordance with an illustrative embodiment.

With reference now to the figures and, in particular, with reference to FIG. 1, an illustration of a platform in which a window system may be implemented is depicted in accordance with an illustrative embodiment. In this illustrative example, platform 100 may be spacecraft 102. Window system 104 may be an example of a window system in spacecraft 102.

In this illustrative example, window system 104 may comprise number of window panes 106, retainer system 108, and seal system 110. As used herein, a "number of" items means one or more items. For example, number of window panes 106 means one or more window panes.

As depicted, number of window panes 106 may include pressure and thermal window pane 118. In these illustrative examples, pressure and thermal window pane 118 may be configured to have substantially desired properties 119. In these illustrative examples, desired properties 119 may include at least one of structural performance 124 and optical performance 125. Structural performance 124 may include at least one of desired ductility 129, desired strength 131, desired thermal resistance 133, and other desirable properties. For example, without limitation, desired strength 131 may include tensile strength, bending strength, shear strength, and/or other suitable types of strengths.

As used herein, the phrase "at least one of", when used with a list of items, means different combinations of one or more of the listed items may be used and only one of each item in the list may be needed. For example, "at least one of item A, item B, and item C" may include, for example, without limitation, item A or item A and item B. This example also may include item A, item B, and item C, or item B and item C. In other examples, "at least one of" may be, for example, without limitation, two of item A, one of item B, and ten of item C; four of item B and seven of item C; and other suitable combinations.

In these illustrative examples, pressure and thermal window pane 118 may be comprised of number of materials 123 selected to provide desired properties 119. Number of materials 123 in pressure and thermal window pane 118 may be a single material or a combination of materials that may be mixed or layered, depending on the particular implementation. In these illustrative examples, number of materials 123 may include, for example, without limitation, at least one of a thermal plastic polymer, a polycarbonate, polymethyl methacrylate, a transparent composite material, acrylic, and other suitable materials.

In one illustrative example, number of materials 123 may be selected such that pressure and thermal window pane 118 has desired ductility 129. Desired ductility 129 for pressure and thermal window pane 118 may be selected as a ductility similar to the ductility of a metal, such as steel, aluminum, titanium, and/or other suitable metals or metal alloys. For example, without limitation, number of materials 123 may be selected such that pressure and thermal window pane 118 may have an ability to bend and/or deform without forming inconsistencies, such as cracks, similar to the ability of metals and metal alloys.

Further, number of materials 123 may be selected such that pressure and thermal window pane 118 may have desired strength 131. Desired strength 131 may be configured to support loads that may be applied to pressure and thermal window pane 118 in window system 104. In these illustrative examples, the desired loads may be similar to or greater than the loads that may be supported by metals or metal alloys, such as steel, aluminum, titanium, and other suitable metals or metal alloys.

Additionally, number of materials 123 may be selected such that pressure and thermal window pane 118 has desired thermal resistance 133. Desired thermal resistance 133 may be selected to provide a desired level of resistance to temperatures outside of a selected range of temperatures in different environments encountered during operation of platform 100. These different environments may include, for example, without limitation, outer space, an underwater environment, a launch environment, and a re-entry environment. The launch environment and the re-entry environment may be environments encountered when platform 100 takes the form of spacecraft 102.

In this manner, desired ductility 129 and desired strength 131 may be selected such that pressure and thermal window pane 118 provides a desired level of protection to pressure exerted on pressure and thermal window pane 118. Further, desired thermal resistance 133 may be selected to provide a desired level of protection from the heat and/or cold encountered in different types of environments. Consequently, pressure and thermal window pane 118 may provide both a desired pressure protection and a desired thermal protection without needing one window pane for pressure protection and another window pane for thermal protection.

Additionally, optical performance 125 may include desired level of visibility 135. Number of materials 123 for pressure and thermal window pane 118 may be selected such that pressure and thermal window pane 118 has desired level of visibility 135 that may allow operators and/or equipment that may use window system 104 to clearly view the environment outside of platform 100.

In these illustrative examples, retainer system 108 may be configured to hold number of window panes 106 in place. Further, seal system 110 may be configured to seal number of window panes 106. Retainer system 108 may indirectly hold number of window panes 106 in place to be in contact with seal system 110 that is already in contact with number of window panes 106.

As one illustrative example, retainer system 108 may be configured to hold pressure and thermal window pane 118 in place. In this illustrative example, retainer system 108 may include outer retainer 126 and inner retainer 127. Outer retainer 126 and inner retainer 127 may be comprised of a material selected from at least one of a metal, a metal alloy, aluminum, titanium, a fiber-reinforced composite, a ceramic composite, and some other suitable type of material.

Outer retainer 126 and inner retainer 127 may be configured to hold pressure and thermal window pane 118 in place between outer retainer 126 and inner retainer 127. Inner retainer 127 may be a structure configured to support pressure and thermal window pane 118. Outer retainer 126 may be a structure configured to hold pressure and thermal window pane 118 against inner retainer 127.

Outer retainer 126 and inner retainer 127 may indirectly contact pressure and thermal window pane 118. More specifically, outer retainer 126 and/or inner retainer 127 may hold pressure and thermal window pane 118 by contacting at least one of pressure seal system 128 and thermal seal system 130 of seal system 110 already in contact with pressure and thermal window pane 118 without outer retainer 126 and inner retainer 127 contacting pressure and thermal window pane 118.

In other words, outer retainer 126 and inner retainer 127 may hold pressure and thermal window pane 118 indirectly with at least one of pressure seal system 128 and thermal seal system 130 located between these retainers. In this manner, pressure seal system 128 and thermal seal system 130 may be located between pressure and thermal window pane 118 and outer retainer 126 and/or inner retainer 127.

Pressure seal system 128 may include number of pressure seals 136 configured to seal pressure and thermal window pane 118. Number of pressure seals 136 may be configured to reduce and/or prevent leaks with respect to fluids and/or gases. For example, without limitation, number of pressure seals 136 may reduce and/or prevent fluids and/or gases from entering into or escaping out of platform 100 around pressure and thermal window pane 118.

Further, thermal seal system 130 may include number of thermal seals 138 configured to seal pressure and thermal window pane 118. Number of thermal seals 138 may be configured to reduce and/or prevent heat from entering into and escaping out of platform 100 around pressure and thermal window pane 118.

Number of pressure seals 136 and number of thermal seals 138 may include any number of components and devices. Further, the materials used for number of pressure seals 136 and number of thermal seals 138 may be selected from various materials. For example, without limitation, these materials may be selected from at least one of an elastomeric material, rubber, silicone, and/or other suitable materials.

In these illustrative examples, one or more of the pressure seals in number of pressure seals 136 and one or more of the thermal seals in number of thermal seals 138 may be reworked and/or replaced during the life of window system 104. A pressure seal in number of pressure seals 136 or a thermal seal in number of thermal seals 138 may be replaced with the same or different type of material depending on the implementation.

In some illustrative examples, number of window panes 106 may include primary thermal window pane 140 in addition to pressure and thermal window pane 118. Primary thermal window pane 140 may be a thermal window pane used when platform 100 takes the form of spacecraft 102 configured for re-entry into Earth's atmosphere and/or reuse. In this manner, primary thermal window pane 140 may provide additional thermal protection for window system 104.

When number of window panes 106 includes both pressure and thermal window pane 118 and primary thermal window pane 140, number of devices 141 may be located between these two window panes. Number of devices 141 may perform at least one of connecting these two window panes, providing a barrier between these two window panes, and sealing the space between these two panes with respect to pressure and temperature. Number of devices 141 may include at least one of a thermal barrier device, a retainer, a pressure seal, a thermal seal, and other suitable types of devices.

In these illustrative examples, at least one of pressure seal system 146 and thermal seal system 148 of seal system 110 may be configured to contact primary thermal window pane 140 and seal primary thermal window pane 140. Pressure seal system 146 may comprise number of pressure seals 154, while thermal seal system 148 may comprise number of thermal seals 156. Further, outer retainer 142 and inner retainer 144 of retainer system 108 may indirectly hold primary thermal window pane 140 by contacting at least one of pressure seal system 146 and thermal seal system 148.

In still other illustrative examples, window system 104 also may include thermal protection system 160. Thermal protection system 160 may cover at least one of a portion of number of window panes 106 and retainer system 108. Thermal protection system 160 may provide additional thermal protection for window system 104.

The illustration of platform 100 in FIG. 1 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, in some illustrative examples, pressure seal system 128 and thermal seal system 130 may be formed by a same number of devices, components, and/or materials. In other words, pressure seal system 128 and thermal seal system 130 may be part of the same system. Further, in some cases, pressure seal system 146 and thermal seal system 148 may be part of the same system.

In other illustrative examples, retainer system 108 may hold pressure and thermal window pane 118 in place using only one retainer instead of outer retainer 126 and inner retainer 127. In some cases, retainer system 108 may include devices in addition to and/or in place of outer retainer 126 and inner retainer 127 to hold pressure and thermal window pane 118 in place.

Figure 2:
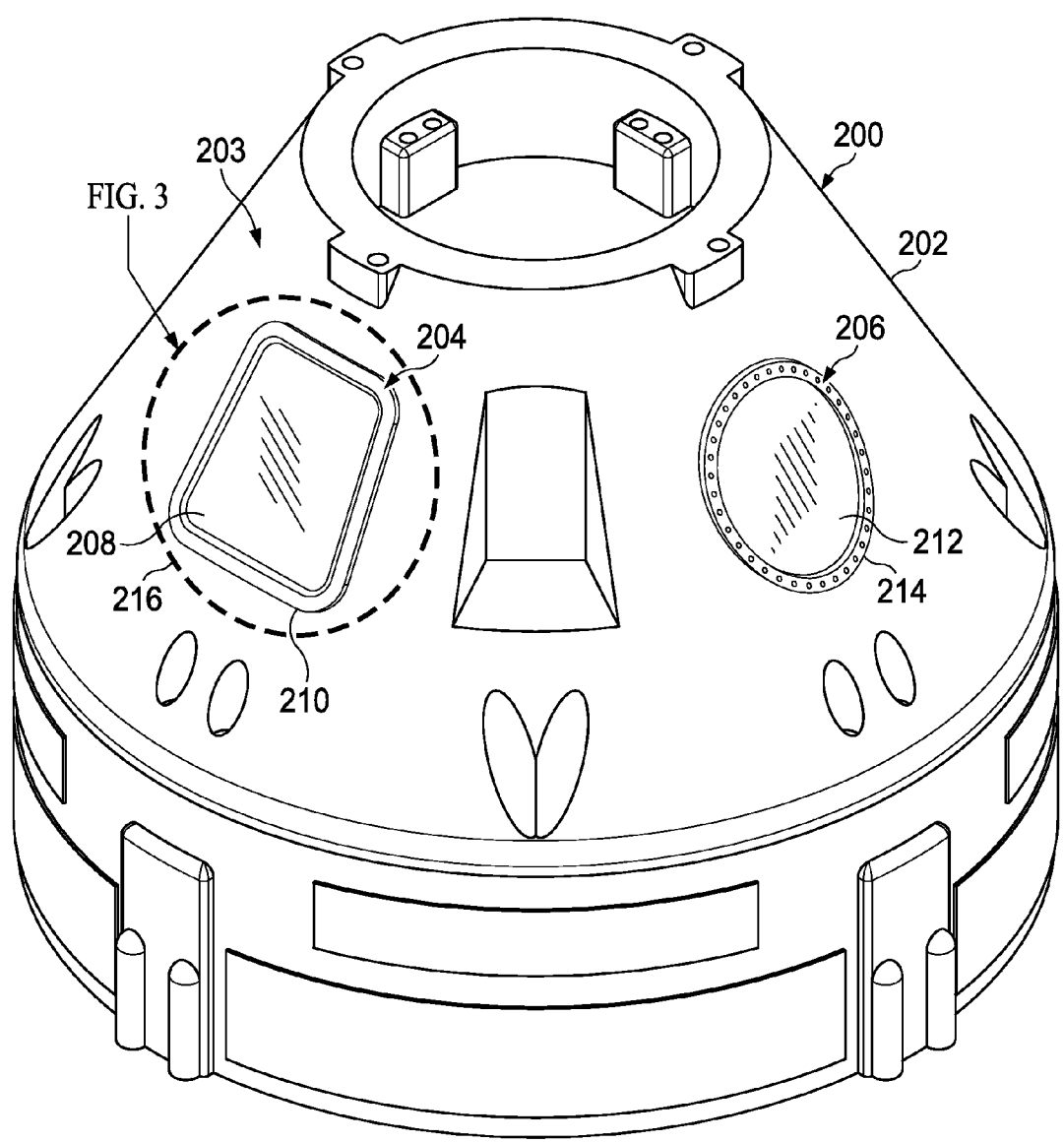
FIG. 2 is an illustration of a spacecraft in accordance with an illustrative embodiment.

With reference now to FIG. 2, an illustration of a spacecraft is depicted in accordance with an illustrative embodiment. In this illustrative example, spacecraft 200 is an example of an implementation for spacecraft 102 in FIG. 1.

Spacecraft 200 is shown in a perspective view. In this example, spacecraft 200 may be capsule 202 with conical shape 203. As depicted, spacecraft 200 may have window system 204 and window system 206. Window system 204 and window system 206 may be examples of implementations for window system 104 in FIG. 1.

In this illustrative example, window system 204 may have window pane 208, while window system 206 may have window pane 212. Window pane 208 and window pane 212 may be examples of implementations for primary thermal window pane 140 in FIG. 1. Window system 204 and window system 206 may each have another type of window pane (not shown) located below window pane 208 and window pane 212, respectively. This other type of window pane (not shown) may be a pressure and thermal window pane, such as pressure and thermal window pane 118 in FIG. 1.

Window pane 208 and window pane 212 may be substantially planar and intersect with conical shape 203 of capsule 202. As depicted, window pane 208 may have trapezoidal shape 210, while window pane 212 may have circular shape 214. Of course, in other illustrative examples, window pane 208 and/or window pane 212 may have other shapes. For example, without limitation, window pane 208 may have an oval shape, a square shape, a hexagonal shape, or some other suitable shape. A more-detailed view of window system 204 in section 216 may be seen in FIG. 3.

Figure 3:
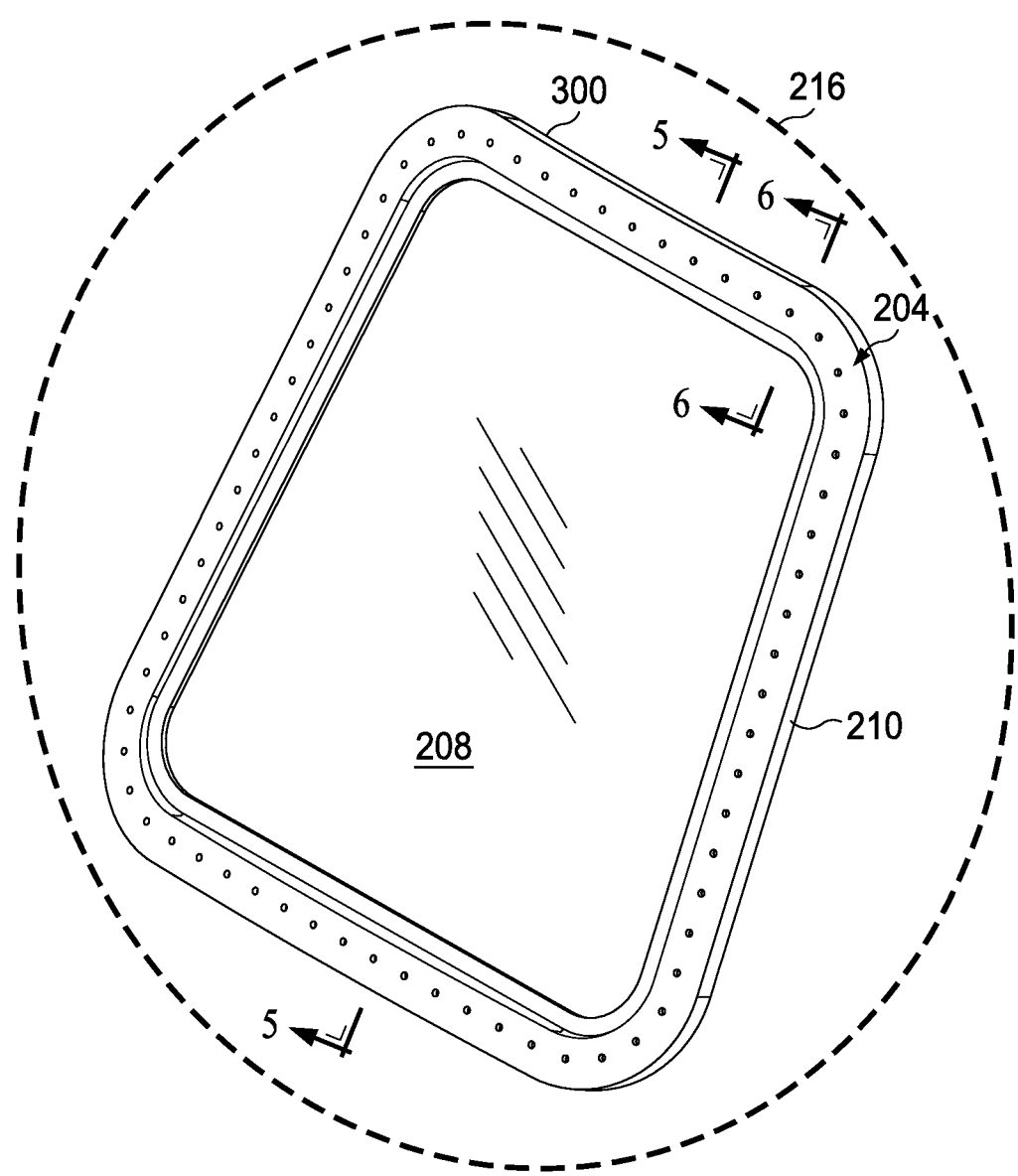
FIG. 3 is an illustration of a window system in accordance with an illustrative embodiment.

With reference now to FIG. 3, an illustration of a window system is depicted in accordance with an illustrative embodiment. In this illustrative example, a more-detailed view of window system 204 in section 216 from FIG. 2 is depicted. In other words, window system 204 with window pane 208 from FIG. 2 may be seen more clearly.

In this illustrative example, thermal protection system 300 in window system 204 may cover different components of window system 204 other than window pane 208. Thermal protection system 300 may be an example of one implementation of thermal protection system 160 in FIG. 1. As depicted, thermal protection system 300 may take the form of a cover that wraps around the edges of window system 204 and covers a retainer system (not shown) that holds window pane 208 in place and/or a seal system (not shown) that seals window pane 208.

Further, thermal protection system 300 may be removed to perform maintenance operations on window pane 208. For example, without limitation, thermal protection system 300 may be removed such that one or more components used in the retainer system (not shown) and/or seal system (not shown) may be reworked and/or replaced.

Figure 4:
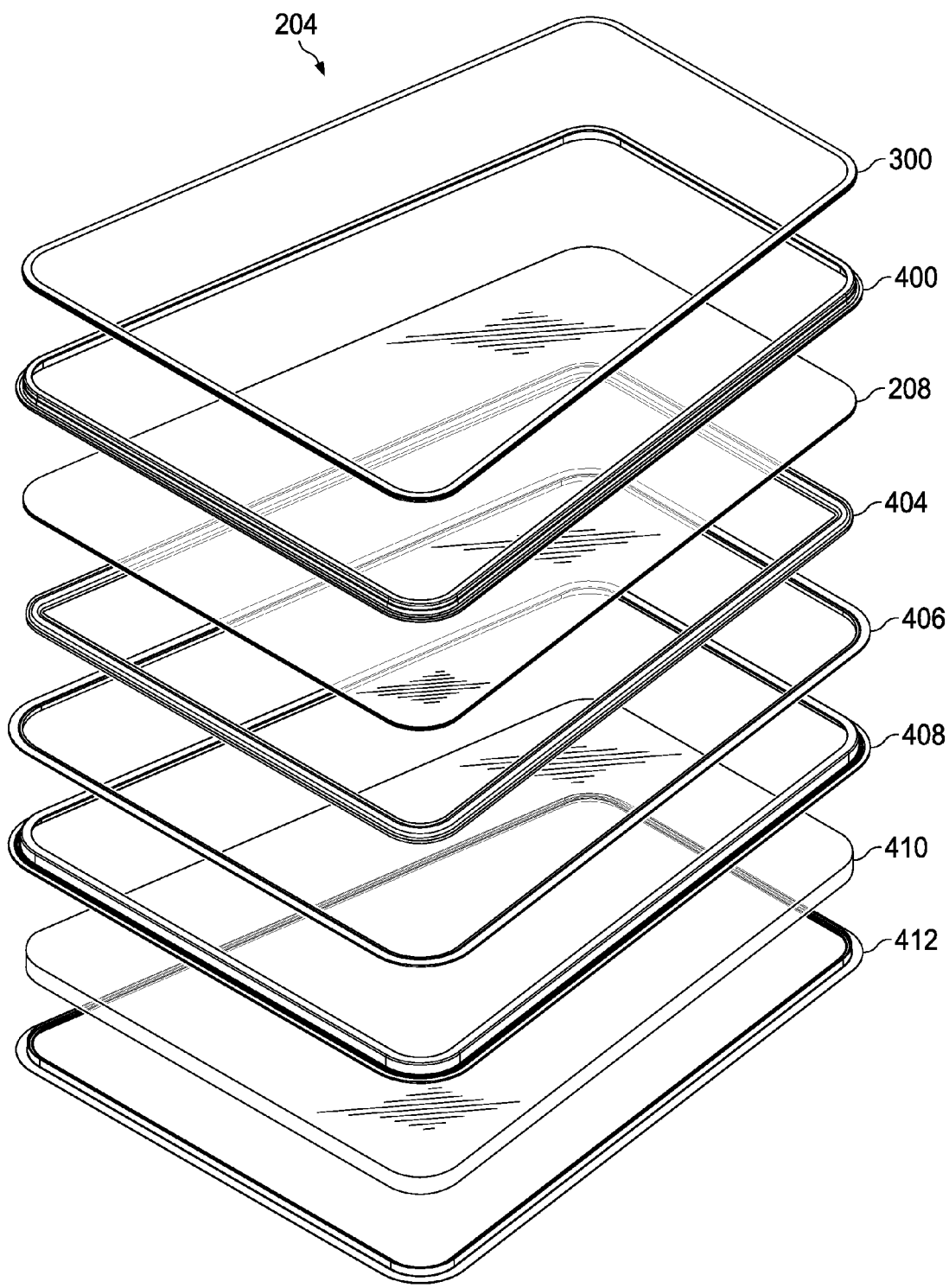
FIG. 4 is an exploded view of a window system in accordance with an illustrative embodiment.

Turning next to FIG. 4, an exploded view of a window system is depicted in accordance with an illustrative embodiment. In this illustrative example, window system 204 from FIG. 2 and FIG. 3 may be depicted in an exploded view such that the different components that form window system 204 may be seen more clearly.

As depicted, window system 204 may comprise thermal protection system 300, outer retainer 400, window pane 208, inner retainer 404, barrier 406, outer retainer 408, pressure and thermal window pane 410, and inner retainer 412. Outer retainer 400 and inner retainer 404 may be an example of one implementation for outer retainer 142 and inner retainer 144, respectively, in FIG. 1. Pressure and thermal window pane 410 may be an example of one implementation for pressure and thermal window pane 118 in FIG. 1.

Further, outer retainer 408 and inner retainer 412 may be an example of one implementation for outer retainer 126 and inner retainer 127, respectively, in FIG. 1. Barrier 406 located between window pane 208 and pressure and thermal window pane 410 may be an example of one implementation for number of devices 141 located between primary thermal window pane 140 and pressure and thermal window pane 118 in FIG. 1. Barrier 406 may be a thermal barrier that provides protection against loss of heat between window pane 208 and pressure and thermal window pane 410.

Additionally, window system 204 also may include a fastener system and a seal system, which are not shown in this view. In this illustrative example, these components may be connected to an external structure (not shown) that may be associated with capsule 202 in FIG. 2.

Figure 5:
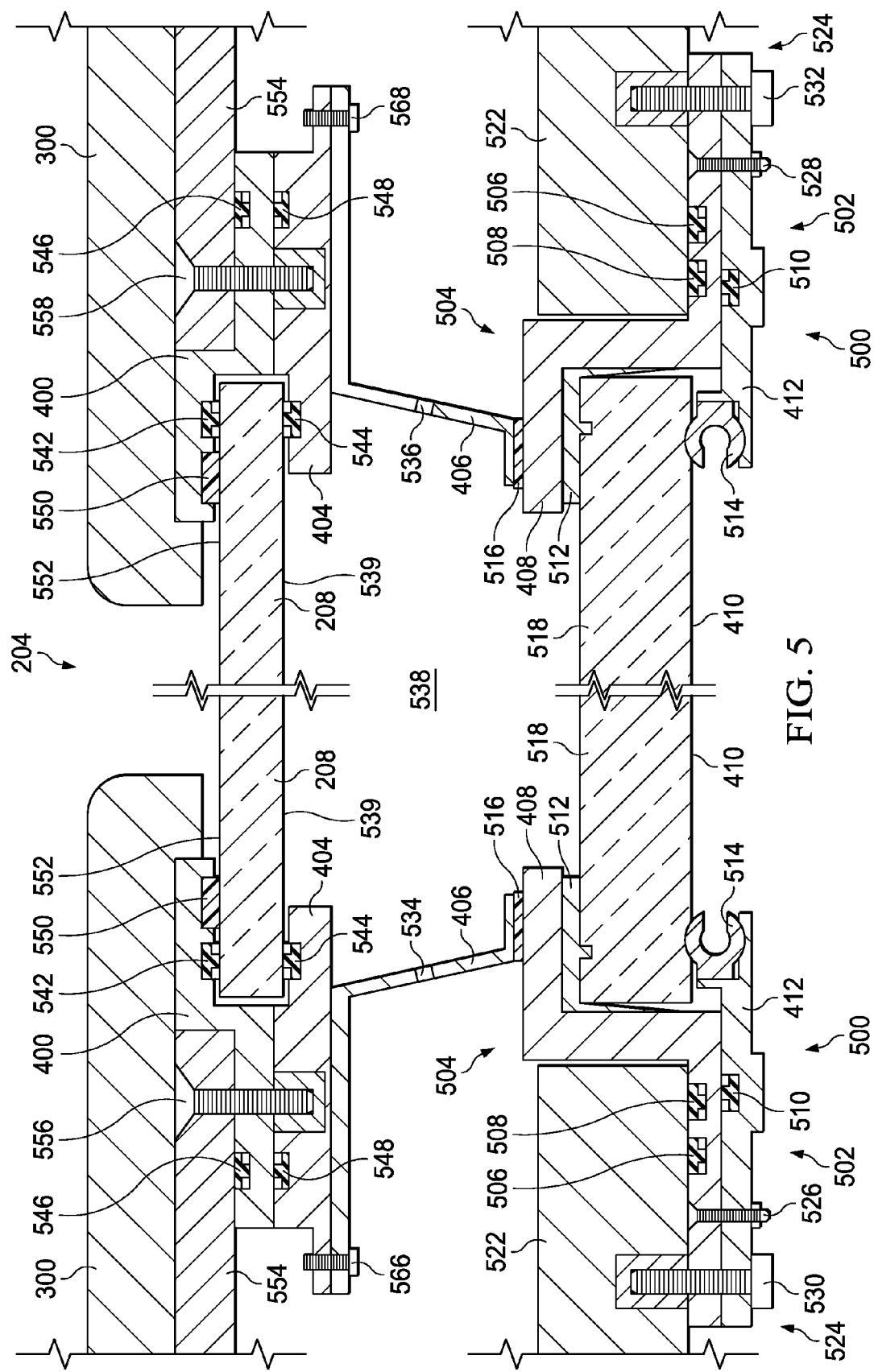
FIG. 5 is an illustration of a cross-sectional view of a window system in accordance with an illustrative embodiment.

With reference now to FIG. 5, an illustration of a cross-sectional view of a window system is depicted in accordance with an illustrative embodiment. As depicted, a cross-sectional view of window system 204 taken along lines 5-5 in FIG. 3 is illustrated.

As depicted, pressure and thermal window pane 410 may be held between outer retainer 408 and inner retainer 412. In these illustrative examples, outer retainer 408 and inner retainer 412 may indirectly hold pressure and thermal window pane 410.

Window system 204 may have seal system 500, which may be an example of one implementation for seal system 110 in FIG. 1. As depicted, seal system 500 may comprise pressure seal system 502 and thermal seal system 504. Pressure seal system 502 may be an example of one implementation for pressure seal system 128 in FIG. 1, while thermal seal system 504 may be an example of one implementation for thermal seal system 130 in FIG. 1.

In this illustrative example, pressure seal system 502 may include pressure seal 506, pressure seal 508, pressure seal 510, pressure seal 512, and pressure seal 514. These pressure seals may be examples of number of pressure seals 136 in FIG. 1. Further, thermal seal system 504 may comprise thermal seal 516, which may be an example of number of thermal seals 138 in FIG. 1.

As illustrated, pressure seal 512 and pressure seal 514 may be configured to contact surface 518 of pressure and thermal window pane 410. Pressure seal 512 may be located between outer retainer 408 and pressure and thermal window pane 410. Pressure seal 514 may be located between inner retainer 412 and pressure and thermal window pane 410.

Pressure seal 510 may be located between outer retainer 408 and inner retainer 412. Pressure seal 506 and pressure seal 508 may be located between outer retainer 408 and internal structure 522. Internal structure 522 may be a structure within spacecraft 200 in FIG. 2.

Fastener system 524 may be used to connect components to each other in these illustrative examples. For example, fastener 526 and fastener 528 in fastener system 524 may be configured to attach outer retainer 408 to inner retainer 412 in a manner such that pressure and thermal window pane 410 may be held by outer retainer 408 and inner retainer 412 in conjunction with pressure seal 512 and pressure seal 514 in pressure seal system 502.

Fastener 530 and fastener 532 may be configured to attach outer retainer 408, inner retainer 412, and internal structure 522 to each other in these illustrative examples.

Thermal seal 516 may be located between outer retainer 408 and barrier 406. In these illustrative examples, barrier 406 may be a thermal barrier. Further, in some illustrative examples, barrier 406 may have opening 534. Opening 534 may be used to reduce moisture in cavity 538. For example, an inert gas, dry air, or some other suitable gas may be passed through opening 534 and opening 536 to reduce moisture that may accumulate in cavity 538.

In this illustrative example, window system 204 also may include window pane 208. In this illustrative example, window pane 208 may take the form of primary thermal window pane 539. Window pane 208 may act as primary thermal window pane 539 in these illustrative examples with pressure and thermal window pane 410 providing secondary thermal protection. In this illustrative example, primary thermal window pane 539 may be held between outer retainer 400 and inner retainer 404.

Seal system 500 may be located between thermal window pane 402 and outer retainer 400 and inner retainer 404. In this illustrative example, seal system 500 may further comprise pressure seal 542, pressure seal 544, pressure seal 546, pressure seal 548, and thermal seal 550. Pressure seal 542, pressure seal 544, and thermal seal 550 may contact surface 552 of primary thermal window pane 539.

Pressure seal 546 may be located between structure 554 and outer retainer 400. Pressure seal 548 may be located between outer retainer 400 and inner retainer 404. In these illustrative examples, fastener 556 and fastener 558 in fastener system 524 may connect outer retainer 400, inner retainer 404, and structure 554 to each other. Additionally, fastener 566 and fastener 568 in fastener system 524 may connect barrier 406 to inner retainer 404 in this illustrative example. Further, thermal protection system 300 may cover structure 554, outer retainer 400, and a portion of thermal window pane 402.

Figure 6:
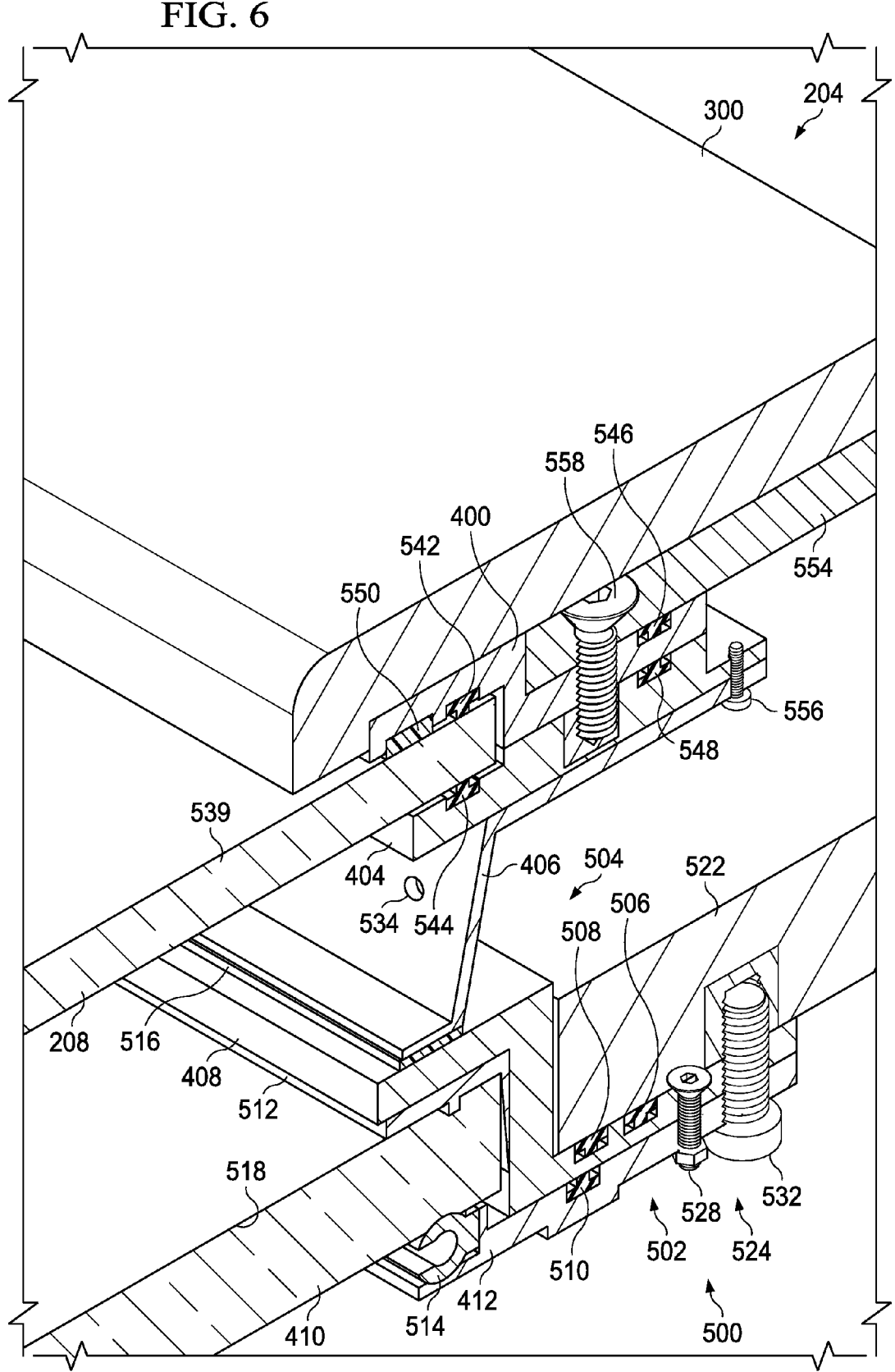
FIG. 6 is an illustration of a cross-sectional view of a window system in accordance with an illustrative embodiment.

Turning now to FIG. 6, an illustration of an orthogonal cross-sectional view of a window system is depicted in accordance with an illustrative embodiment. As depicted, a cross-sectional view of window system 204 taken along lines 6-6 in FIG. 3 is shown as an orthogonal cross-sectional view of window system 204.

As depicted in the illustrative examples, pressure and thermal window pane 410 may provide both pressure protection and thermal protection such that a single window pane, such as pressure and thermal window pane 410, may be used instead of one window pane that provides pressure protection another window pane that provides thermal protection. In these illustrative examples, pressure and thermal window pane 410 may be comprised of material configured to provide desired pressure and thermal protection.

Figure 7:
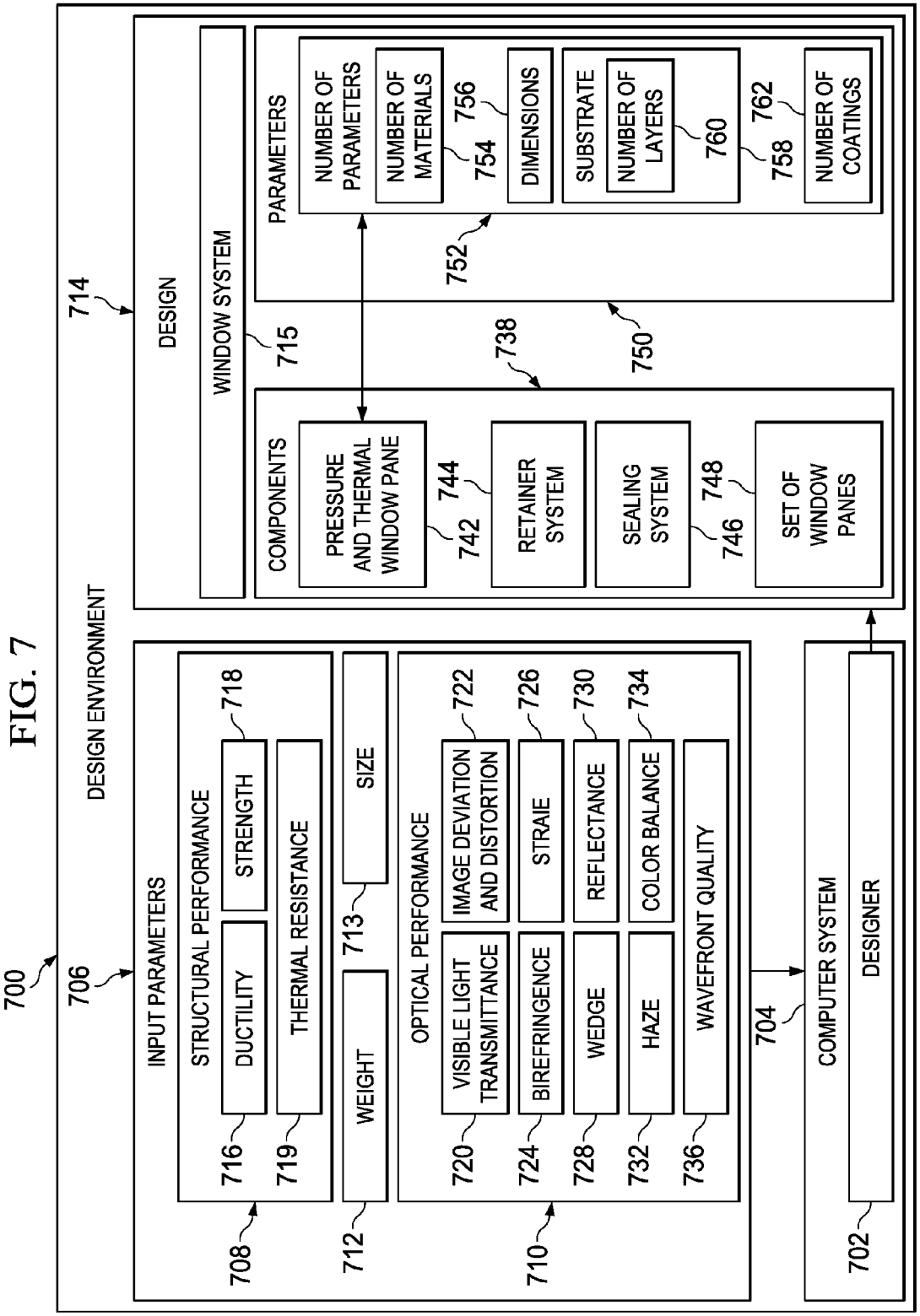
FIG. 7 is an illustration of a design environment in accordance with an illustrative embodiment.

Turning next to FIG. 7, an illustration of a design environment is depicted in accordance with an illustrative embodiment. In this illustrative example, design environment 700 may be used to design window system 104 in FIG. 1.

In this illustrative example, design environment 700 may include designer 702. Designer 702 may be implemented using hardware, software, or a combination of the two. In this illustrative example, designer 702 may be implemented in computer system 704. Computer system 704 may be one or more computers. When more than one computer is present in computer system 704, those computers may be in communication with each other. The communication may occur over a local area network or any other suitable medium.

In this illustrative example, designer 702 may receive input parameters 706. Input parameters 706 may include at least one of structural performance 708, optical performance 710, weight 712, size 713, and other suitable parameters. These parameters may be used to generate design 714 for window system 715.

In these illustrative examples, structural performance 708 may include at least one of ductility 716, strength 718, thermal resistance 719, and other suitable parameters for structural performance 708. Structural performance 708 may be used to identify forces, loads, pressure, temperature, and other environmental factors that may be encountered by window system 715 when in use on a platform.

Optical performance 710 may include various factors. These factors may include properties desired for window system 715 when used in a platform. For example, optical performance 710 may include at least one of visible light transmittance 720, image deviation and distortion 722, birefringence 724, striae 726, wedge 728, reflectance 730, haze 732, color balance 734, wavefront quality 736, and other suitable factors. These parameters in optical performance 710 may be used to identify parameters that provide operators using window system 715 the ability to obtain information about the environment outside of the platform. For example, without limitation, operators may view the environment, generate images from cameras, and use other sensors to obtain information about the environment through window system 715.

Weight 712 may be weight that may be desired for window system 715. Size 713 may be a size of window system 715. Of course, other parameters may be included in addition to or in place of these parameters, depending on the particular implementation.

As illustrated, designer 702 may generate components 738 in design 714. Components 738 may include pressure and thermal window pane 742, retainer system 744, seal system 746, and set of window panes 748. A set, as used herein, refers to zero or more items. For example, a set of window panes may be zero, one, two, or some other number of window panes.

Design 714 also may include parameters 750. Parameters 750 may be parameters for components 738 for window system 715. For example, designer 702 may generate number of parameters 752 specifically for window system 715. Number of parameters 752 may include, for example, without limitation, number of materials 754, dimensions 756, and other suitable materials. In this illustrative example, number of materials 754 may be selected based on structural performance 708 and optical performance 710 in input parameters 706. Additionally, in some cases, pressure and thermal window pane 742 may comprise substrate 758 comprised of number of layers 760.

Additionally, number of parameters 752 may include number of coatings 762 that may be placed on substrate 758. Number of coatings 762 may be used to provide optical performance 710 for pressure and thermal window pane 742.

With reference now to FIG. 8, an illustration of a flowchart of a process for operating a vehicle is depicted in accordance with an illustrative embodiment. In this illustrative example, the process may be implemented in platform 100 in FIG. 1.

The process may operate platform 100 with window system 104 having pressure and thermal window pane 118 (operation 800). In this illustrative example, pressure and thermal window pane 118 may be configured to provide desired pressure protection and desired thermal protection when exposed to an environment around platform 100 during operation of platform 100. Pressure and thermal window pane 118 may have desired ductility 129, desired strength 131, desired thermal resistance 133, and desired level of visibility 135.

The process may expose window system 104 to an environment (operation 802), with the process terminating thereafter. In these illustrative examples, the environment may be outer space, an underwater environment, the atmosphere, or some other suitable environment. The atmosphere may be the Earth's atmosphere or the atmosphere of some other celestial body.

When platform 100 takes the form of spacecraft 102, the environment around platform 100 may include a launch environment in which spacecraft 102 is launched into outer space. Also, with spacecraft 102, the environment may include a re-entry environment in which spacecraft 102 re-enters the atmosphere from outer space. These environments may be examples of environments in which pressure and/or heat may be present.

Turning now to FIG. 9, an illustration of a process for designing a window system is depicted in accordance with an illustrative embodiment. In this illustrative example, the process may be implemented in designer 702 in design environment 700 in FIG. 7.

The process may begin by receiving input parameters 706 (operation 900). The process may then generate design 714 for window system 715 from input parameters 706 (operation 902), with the process terminating thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, segment, function, and/or a portion of an operation or step. For example, one or more of the blocks may be implemented as program code, in hardware, or a combination of the program code and hardware. When implemented in hardware, the hardware may, for example, without limitation, take the form of integrated circuits that are manufactured or configured to perform one or more operations in the flowcharts or block diagrams.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Turning now to FIG. 10, an illustration of a data processing system is depicted in accordance with an illustrative embodiment. Data processing system 1000 may be used to implement one or more computers in computer system 704 in FIG. 7.

In this illustrative example, data processing system 1000 may include communications framework 1002, which provides communications between processor unit 1004, memory 1006, persistent storage 1008, communications unit 1010, input/output (I/O) unit 1012, and display 1014. In this example, communications framework 1002 may take the form of a bus system.

Processor unit 1004 may serve to execute instructions for software that may be loaded into memory 1006. Processor unit 1004 may be a number of processors, a multi-processor core, or some other type of processor, depending on the particular implementation.

Memory 1006 and persistent storage 1008 may be examples of storage devices 1016. A storage device may be any piece of hardware that is capable of storing information, such as, for example, without limitation, data, program code in functional form, and/or other suitable information either on a temporary basis and/or a permanent basis. Storage devices 1016 may also be referred to as computer readable storage devices in these illustrative examples. Memory 1006, in these examples, may be, for example, without limitation, a random access memory or any other suitable volatile or non-volatile storage device. Persistent storage 1008 may take various forms, depending on the particular implementation.

For example, persistent storage 1008 may contain one or more components or devices. For example, persistent storage 1008 may be a hard drive, a flash memory, a rewritable optical disk, a rewritable magnetic tape, or some combination of the above. The media used by persistent storage 1008 also may be removable. For example, a removable hard drive may be used for persistent storage 1008.

Communications unit 1010, in these illustrative examples, may provide for communications with other data processing systems or devices. In these illustrative examples, communications unit 1010 may be a network interface card.

Input/output unit 1012 may allow for input and output of data with other devices that may be connected to data processing system 1000. For example, input/output unit 1012 may provide a connection for user input through a keyboard, a mouse, and/or some other suitable input device. Further, input/output unit 1012 may send output to a printer. Display 1014 may provide a mechanism to display information to a user.

Instructions for the operating system, applications, and/or programs may be located in storage devices 1016, which are in communication with processor unit 1004 through communications framework 1002. The processes of the different embodiments may be performed by processor unit 1004 using computer-implemented instructions, which may be located in a memory, such as memory 1006.

These instructions may be referred to as program code, computer usable program code, or computer readable program code that may be read and executed by a processor in processor unit 1004. The program code in the different embodiments may be embodied on different physical or computer readable storage media, such as memory 1006 or persistent storage 1008.

Program code 1018 may be located in a functional form on computer readable media 1020 that is selectively removable and may be loaded onto or transferred to data processing system 1000 for execution by processor unit 1004. Program code 1018 and computer readable media 1020 may form computer program product 1022 in these illustrative examples. In one example, computer readable media 1020 may be computer readable storage media 1024 or computer readable signal media 1026.

In these illustrative examples, computer readable storage media 1024 may be a physical or tangible storage device used to store program code 1018 rather than a medium that propagates or transmits program code 1018.

Alternatively, program code 1018 may be transferred to data processing system 1000 using computer readable signal media 1026. Computer readable signal media 1026 may be, for example, without limitation, a propagated data signal containing program code 1018. For example, without limitation, computer readable signal media 1026 may be an electromagnetic signal, an optical signal, and/or any other suitable type of signal. These signals may be transmitted over communications links, such as wireless communications links, optical fiber cable, coaxial cable, a wire, and/or any other suitable type of communications link.

The different components illustrated for data processing system 1000 are not meant to provide architectural limitations to the manner in which different embodiments may be implemented. The different illustrative embodiments may be implemented in a data processing system including components in addition to and/or in place of those illustrated for data processing system 1000. Other components shown in FIG. 10 may be varied from the illustrative examples shown. The different embodiments may be implemented using any hardware device or system capable of running program code 1018. Illustrative embodiments of the disclosure may be described in the context of platform manufacturing and service method 1100 as shown in FIG. 11 and platform 1200 as shown in FIG. 12.

Turning first to FIG. 11, an illustration of a platform manufacturing and service method is depicted in accordance with an illustrative embodiment. During pre-production, platform manufacturing and service method 1100 may include specification and design 1102 of platform 1200 in FIG. 12 and material procurement 1104.

During production, component and subassembly manufacturing 1106 and system integration 1108 of platform 1200 in FIG. 12 may take place. Thereafter, platform 1200 may go through certification and delivery 1110 in order to be placed in service 1112. While in service 1112 by a customer, platform 1200 may be scheduled for routine maintenance and service 1114, which may include modification, reconfiguration, refurbishment, and other maintenance or service.

Each of the processes of platform manufacturing and service method 1100 may be performed or carried out by a system integrator, a third party, and/or an operator. In these examples, the operator may be a customer. For the purposes of this description, a system integrator may include, for example, without limitation, any number of spacecraft manufacturers and major-system subcontractors; a third party may include, without limitation, any number of vendors, subcontractors, and suppliers; and an operator may be an airline, a leasing company, a military entity, a service organization, and so on.

Although an aerospace example is shown, different illustrative embodiments may be applied to various industries, such as the spacecraft industry, the aircraft industry, the automotive industry, the ship industry, and/or other suitable industries. Platform 100 in FIG. 1 may also take various forms. For example, without limitation, platform 100 may be selected from one of a mobile platform, a stationary platform, a land-based structure, an aquatic-based structure, a space-based structure, a vehicle, an aircraft, a space capsule, a space shuttle, a submarine, and other suitable types of platforms.

With reference now to FIG. 12, an illustration of a platform is depicted in which an illustrative embodiment may be implemented. In this illustrative example, platform 1200 may be produced by platform manufacturing and service method 1100 in FIG. 11.

Platform 1200 may include frame 1202 with a plurality of systems 1204 and interior 1206. Number of window systems 1205 may be associated with frame 1202. Window system 104 in FIG. 1 may be an example of one implementation for one of number of window systems 1205. Examples of systems 1204 may include one or more of propulsion system 1208, electrical system 1210, hydraulic system 1212, environmental system 1214, and thermal protection system 1216.

Apparatuses and methods embodied herein may be employed during at least one of the stages of platform manufacturing and service method 1100 in FIG. 11. In one illustrative example, components or subassemblies produced in component and subassembly manufacturing 1106 may be fabricated or manufactured in a manner similar to components or subassemblies produced while platform 1200 is in service 1112 in FIG. 11.

As yet another example, a number of apparatus embodiments, method embodiments, or a combination thereof may be utilized during production stages, such as component and subassembly manufacturing 1106 and system integration 1108 in FIG. 11. A number, when referring to items, means one or more items. For example, without limitation, a number of apparatus embodiments is one or more apparatus embodiments. A number of apparatus embodiments, method embodiments, or a combination thereof may be utilized while spacecraft 102 in FIG. 1 is in service 1112 and/or during maintenance and service 1114 in FIG. 11. The use of a number of the different illustrative embodiments may substantially expedite the assembly of and/or reduce the cost of platform 1200.

In particular, at least one of a method and apparatus for an illustrative embodiment may be implemented for a window system in platform 1200. With a window system, such as window system 104, removal and installation of window panes may be performed more quickly, for less cost, or some combination thereof.

Thus, the illustrative embodiments may reduce the number of window panes used to provide desired structural performance, desired optical performance, or a combination of the two. For example, pressure and thermal window pane 118 may remove the need for a secondary pressure pane. In other words, sufficient thermal protection may be provided by pressure and thermal window pane 118 and thermal window pane 122. Further, pressure and thermal window pane 118 may provide desired structural performance 124, such as acting as a pressure barrier, and desired optical performance 125. Also, a need for another secondary thermal window pane used with thermal window pane 122 may be avoided.

The description of the different illustrative embodiments has been presented for purposes of illustration and description and is not intended to be exhaustive or limited to the embodiments in the form disclosed. Many modifications and variations may be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A window system for a space vehicle, the window system comprising:
    a sum total of two window panes, the two window panes comprising:
        a primary thermal window pane, the primary thermal window pane providing desired thermal protection for the space vehicle during at least one of re-entry and launch; and
        a pressure and thermal window pane providing desired pressure protection and desired thermal protection for the space vehicle during operation of the space vehicle, the operation including at least one of re-entry and launch, in which the pressure and thermal window pane has a desired ductility;
    a seal system contacting the two window panes to seal the primary thermal window pane and the pressure and thermal window pane; and
    a retainer system holding the seal system and the two window panes.

2. The window system of claim 1, wherein the seal system comprises at least one of a number of pressure seals and a number of thermal seals.

3. The window system of claim 1, wherein the pressure and thermal window pane is comprised of a number of materials selected such that the pressure and thermal window pane has a desired structural performance such that the pressure and thermal window pane acts as a pressure barrier and a desired optical performance such that an occupant of the space vehicle may obtain information about an environment outside of the space vehicle through the pressure and thermal window pane.

4. The window system of claim 1, wherein the pressure and thermal window pane is comprised of a number of materials including at least one of a thermal plastic polymer, a polycarbonate, polymethyl methacrylate, a transparent composite material, and acrylic.

5. The window system of claim 3, wherein the desired structural performance includes the desired ductility, a desired strength, and a desired thermal resistance, wherein the desired ductility is a ductility similar to the ductility of a metal, wherein the desired strength is a strength capable of supporting loads similar to loads that may be supported by metals or metal alloys, wherein the desired thermal resistance provides a desired level of resistance to temperatures encountered during re-entry and launch, and wherein the desired optical performance includes a desired level of visibility.

6. A method for operating a space vehicle, the method comprising:

operating the space vehicle having a window system comprising a sum total of two window panes, the two window panes comprising a primary thermal window pane, the primary thermal window pane providing desired thermal protection for the space vehicle during at least one of re-entry and launch and a pressure and thermal window pane which provides desired pressure protection and desired thermal protection for the space vehicle during operation of the space vehicle, the operation including at least one of re-entry and launch, in which the pressure and thermal window pane has a desired ductility; a seal system contacting the two window panes to seal the primary thermal window pane and the pressure and thermal window pane; and a retainer system holding the seal system and the two window panes; and exposing the window system to at least one of a re-entry environment and a launch environment while the space vehicle is operating.

7. The method of claim 6, wherein the seal system comprises at least one of a number of pressure seals and a number of thermal seals.

8. The method of claim 6, wherein the window system further comprises a thermal protection system configured to cover an outer retainer of the retainer system.

9. The method of claim 6, wherein the pressure and thermal window pane is comprised of a number of materials selected such that the pressure and thermal window pane has a desired structural performance that includes the desired ductility such that the pressure and thermal window pane acts as a pressure barrier and a desired optical performance such that an occupant of the space vehicle may obtain information about the environment outside of the space vehicle through the pressure and thermal window pane.

10. The method of claim 6, wherein the pressure and thermal window pane is comprised of a number of materials including at least one of a thermal plastic polymer, a polycarbonate, polymethyl methacrylate, a transparent composite material, and acrylic.

11. The window system of claim 1, wherein the pressure and thermal window pane is substantially aligned with an inner structure of the space vehicle.

12. The window system of claim 11, wherein the primary thermal window pane is substantially aligned with an outer structure forming a skin of the space vehicle.

13. The window system of claim 1, further comprising a barrier positioned between the pressure and thermal window pane and the primary thermal window pane, the forming a cavity, wherein the barrier is a thermal barrier providing protection against loss of heat between the primary thermal window pane and the pressure and thermal window pane.

14. The method of claim 6, wherein the pressure and thermal window pane is substantially aligned with an inner structure of the space vehicle.

15. The method of claim 14, wherein the primary thermal window pane is substantially aligned with an outer structure forming a skin of the space vehicle, and wherein the primary thermal window pane is an outermost pane of the window system and the thermal and pressure window pane is an innermost pane of the window system.

16. The method of claim 15, further comprising a barrier positioned between the pressure and thermal window pane and the primary thermal window pane forming a cavity, wherein the barrier is a thermal barrier that provides protection against loss of heat between the primary thermal window pane and the pressure and thermal window pane.

17. A window system for a spacecraft comprising:
a sum total of two window panes, the two window panes comprising:
a pressure and thermal window pane comprised of a number of materials including at least one of a thermal plastic polymer, a polycarbonate, polymethyl methacrylate, a transparent composite, and acrylic, the pressure and thermal window pane having an inner surface within a pressurized interior of the spacecraft; and
a primary thermal window pane having an outer surface exposed to an environment outside of the spacecraft;
a first retainer system holding the pressure and thermal window pane in place;
a second retainer system holding the primary thermal window pane in place; and
a barrier positioned between the first retainer system and the second retainer system, wherein the barrier is a thermal barrier that provides protection against loss of heat between the primary thermal window pane and the pressure and thermal window pane.

18. A method for operating a spacecraft, the method comprising:
operating the spacecraft having a window system comprising a sum total of two window panes, the two window panes comprising a primary thermal window pane having an outer surface exposed to an environment outside of the spacecraft and a pressure and thermal window pane comprised of a number of materials including at least one of a thermal plastic polymer, a polycarbonate, polymethyl methacrylate, a transparent composite, and acrylic, the pressure and thermal window pane having an inner surface within a pressurized interior of the spacecraft; a first retainer system holding the pressure and thermal window pane in place; a second retainer system holding the primary thermal window pane in place; and a barrier positioned between the first retainer system and the second retainer system, wherein the barrier is a thermal barrier that provides protection against loss of heat between the primary thermal window pane and the pressure and thermal window pane; and
exposing the window system to at least one of a re-entry environment and a launch environment while the spacecraft is operating.

19. The window system of claim 13, wherein the barrier has an increasing circumference moving from the pressure and thermal window pane to the primary thermal window pane.

20. The window system of claim 1 further comprising:
a thermal protection system configured to cover an outer retainer of the retainer system.

21. The window system of claim 17, wherein the barrier has an increasing circumference moving from the pressure and thermal window pane to the primary thermal window pane.

22. The window system of claim 17 further comprising:
a thermal protection system configured to cover an outer retainer of the second retainer system.

* * * * *